J. LANDON & F. W. MARTYN.
SELF PROPELLED VEHICLE.
APPLICATION FILED MAR. 22, 1916.

1,266,495.

Patented May 14, 1918.
4 SHEETS—SHEET 1.

Inventors
Jesse Landon & Frederick William Martyn
by
Attorney.

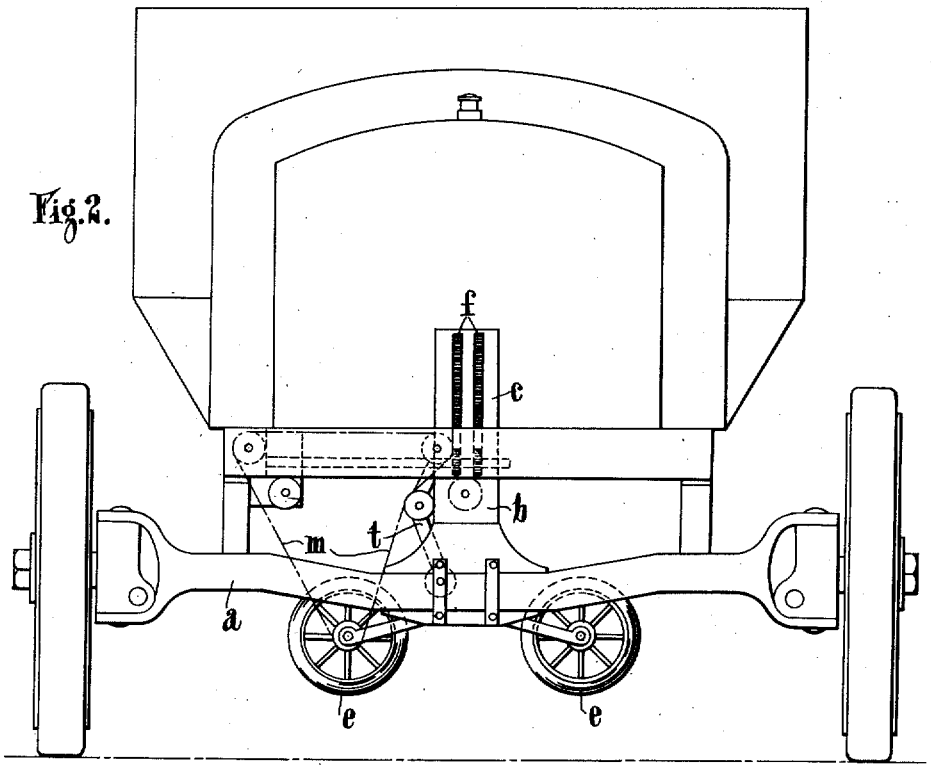
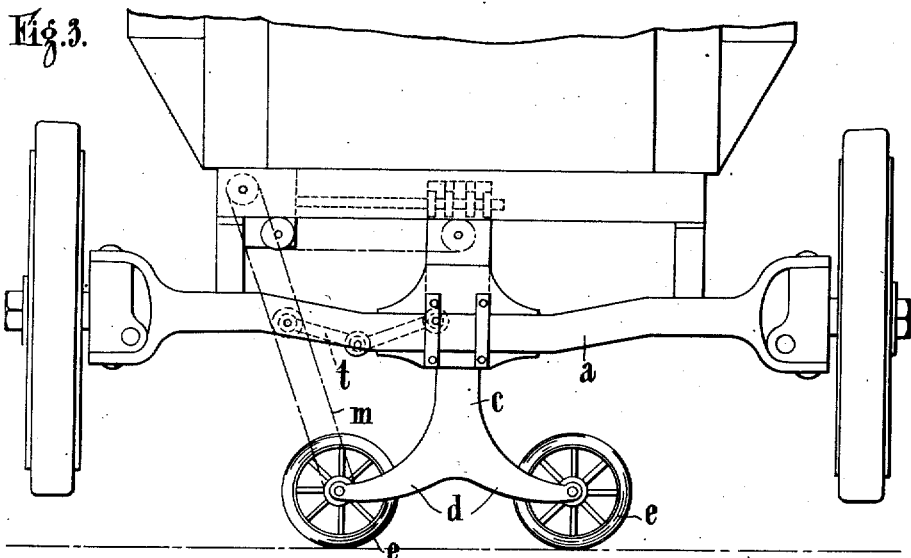

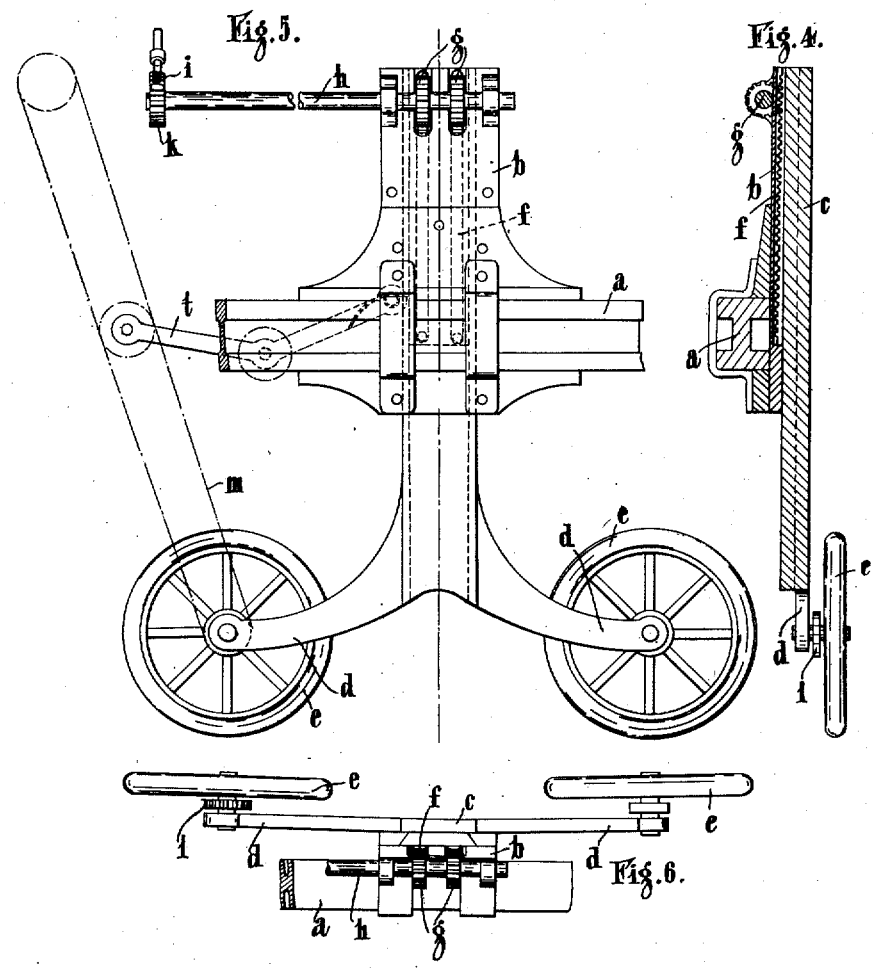

UNITED STATES PATENT OFFICE.

JESSE LANDON AND FREDERICK WILLIAM MARTYN, OF WATFORD, ENGLAND.

SELF-PROPELLED VEHICLE.

1,266,495.  Specification of Letters Patent.  Patented May 14, 1918.

Application filed March 22, 1916. Serial No. 85,762.

*To all whom it may concern:*

Be it known that we, JESSE LANDON, of Aysgarth, St. John's Road, Watford, in the county of Hertford, England, and FREDERICK WILLIAM MARTYN, of 18 Granville road, Watford, in the county of Hertford, England, subjects of the King of Great Britain and Ireland, have invented certain new and useful Improvements in or Relating to Self-Propelled Vehicles, of which the following is a specification.

This invention relates to improvements in self-propelled vehicles of the type which are provided with a depressible wheel or wheels or like anti-friction device or devices adapted to raise one pair of wheels of the vehicle off the ground surface and mechanical means operated from the engine or prime mover of the vehicle for rotating said wheel or wheels in one direction or the other so that the vehicle may be turned in a restricted space around a vertical axis situated within its own length.

The object of the present invention is to improve the construction of such devices, and according to our invention we provide a self-propelled vehicle with a guide fixed to or mounted upon one of the axles of the vehicle, a block or like member carrying the auxiliary wheel or wheels adapted to slide in said guide and provided with a pair of racks, two spur pinions engaging said racks through apertures in the guide and mounted upon a transverse shaft carried in bearings on said guide and a reversible chain or like drive for said auxiliary wheel or one of said wheels.

The invention also consists in the particular construction of device hereinafter described with reference to the accompanying drawings which illustrate the manner of carrying out the invention.

Fig. 2 is a front elevation of the vehicle shown in Fig. 1.

Fig. 3 is a similar view to Fig. 2 showing the disposition of the parts when the vehicle is to be turned.

Figs. 4, 5 and 6 are respectively a side sectional elevation, front elevation and plan showing on a larger scale a portion of the apparatus shown in Figs. 1 and 2.

In carrying our invention into effect in its application to any usual form of four-wheeled motor-driven vehicle we provide upon one of the vehicle axles, as for example upon the front axle *a*, a guide or bracket *b* within which a block or plate *c* or like fitting is slidably mounted, the block or the like carrying at its lower extremity a pair of arms or brackets *d* upon each of which a small wheel *e*, roller, or like anti-friction device, is mounted, although it will be understood that a single wheel arranged centrally in respect of the block may be employed if desired.

Figure 1:
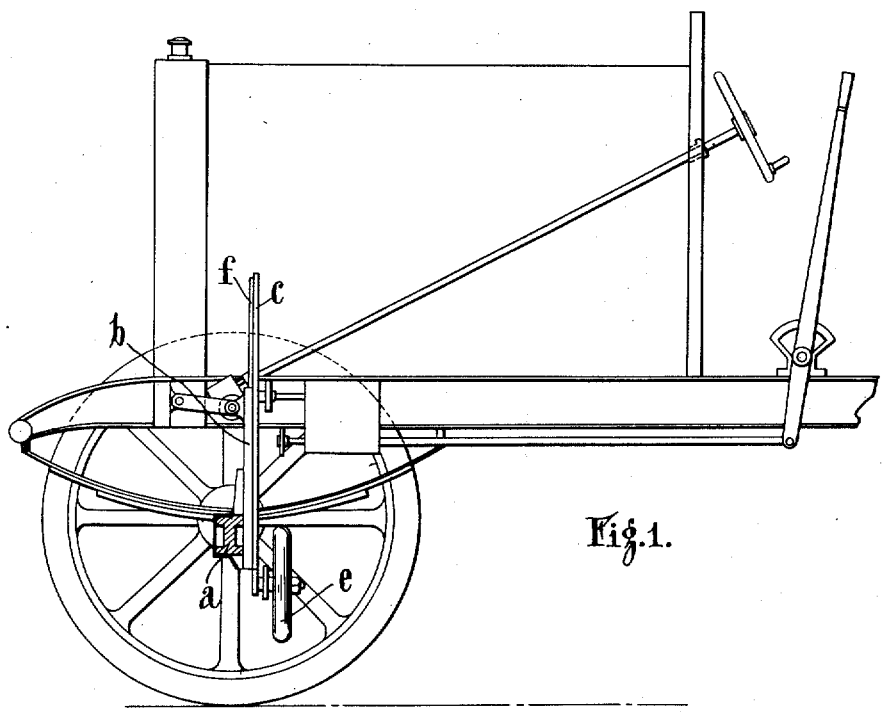
Figure 1 is a fragmentary view illustrating the front portion of a vehicle constructed and arranged in accordance with the invention.

The fitting is provided with a pair of racks *f* adapted to be engaged by two spur wheels *g* mounted upon a shaft *h* carried in bearings upon the guide *b*, the shaft *h* being adapted to be rotated by hand by means of a worm *i* and worm wheel *k* or other suitable gearing or by power-operated means, the arrangement being such that while normally the wheels *e* are in the raised position shown in Figs. 1 and 2 they may be depressed by means of the racks and pinions so as to raise the front portion of the vehicle off the surface of the ground into the position shown in Fig. 3.

When the vehicle is in the raised position shown, for example, in Fig. 3, one or both of the traversing wheels or rollers is or are adapted to be driven from the engine or prime mover of the vehicle or from any other convenient source by suitable chain belt or the like so that the vehicle is turned or pivoted upon a vertical axis of rotation until it assumes the required position. When the traversing wheels or the like are arranged upon arms or brackets the latter may, if desired, be formed in an arc of a circle, the center of which coincides approximately with the center of the back axle, and it is then found that the rear wheels with their attendant differential gearing will readily accommodate themselves to the turning or pivoting movement of the car or vehicle.

Figure 7:
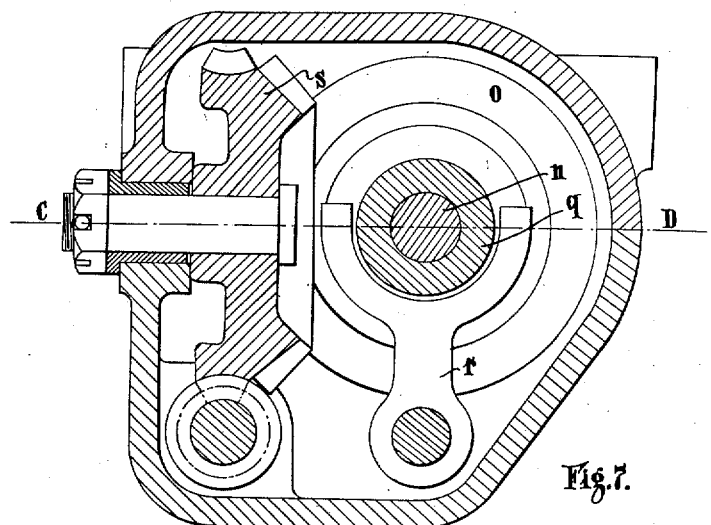
Fig. 7 is a sectional elevation on the line A—B of Fig. 8 showing a further detail on a larger scale.
Figure 8:
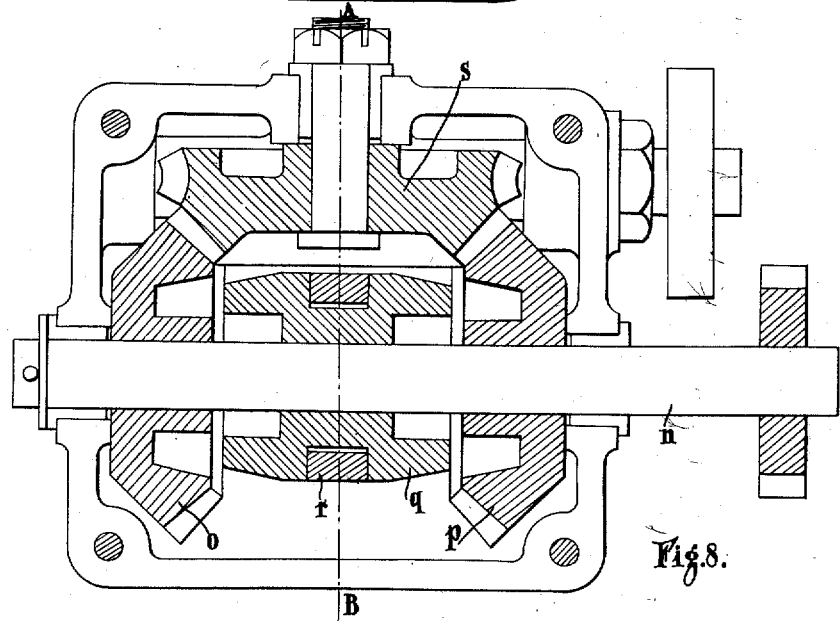
Fig. 8 is a section upon the line C—D of Fig. 7.

In the construction illustrated one of the traversing wheels *e* is provided with a chain wheel *l* which is adapted to be driven by means of a chain *m* from a countershaft *n* (Fig. 8) on which are mounted two bevel wheels $o\ p$ adapted to be engaged respectively by the clutch $q$ which may be moved by the forked lever $r$ (Fig. 7) so that the shaft $m$ may be driven by either of the wheels $o$ or $p$, the direction of turning of the vehicle depending upon which of these beveled wheels is at the moment being employed.

The bevel wheels $o$ and $p$ are adapted to be driven by a third bevel wheel $s$ which is rotated from the engine or prime mover of the vehicle by worm and worm wheel or other suitable gearing.

Suitable means such, for example, as the spring-controlled lever $t$ carrying a chain wheel at its end may be employed for taking up the slack in the chain $m$ as the wheels or the like $e$ are returned into the raised position shown in Fig. 2.

Having now described our invention, what we claim as new and desire to secure by Letters Patent is:—

1. In a self-propelled vehicle the combination of an axle, a guide upon said axle, a member slidable in said guide, a pair of wheels spaced apart and carried at the lower end of said member, means for depressing said member to raise the vehicle, a power shaft for driving one of said wheels, a chain drive connecting said power shaft with said wheel and means for automatically taking up the slack in the chain drive as the slidable member is moved into its raised position.

2. A vehicle turning device comprising: a vertically movable member mounted adjacent one end thereof, oppositely extending arms carried by the lower end of the vertically movable member and projecting laterally therefrom with relation to the longitudinal axis of the vehicle, wheels carried at the extremities of said arms in tandem relation to each other, means for lowering said vertically movable member to raise the corresponding end of the vehicle, and means for rotating one of said wheels to swing the vehicle about the other end as a pivot.

3. In a self-propelled vehicle the combination of an axle, a guide upon said axle, a member slidable in said guide, an anti-friction wheel carried upon the lower end of said member, racks upon said member, bearings upon said guide, a transverse shaft carried by said bearings, pinions upon said shaft engaging with said racks, means for driving said shaft, a chain drive for rotating said anti-friction wheel and means for automatically taking up the slack in said chain drive as the anti-friction wheel is moved into its upper position.

4. In a self-propelled vehicle the combination of an axle, a guide upon said axle, a member slidable in said guide, a pair of wheels spaced apart and carried upon the lower end of said member, racks upon said member, bearing upon said guide, a transverse shaft carried by said bearings, pinions upon said shaft engaging with said racks, means for driving said shaft, a reversible chain drive for rotating one of said wheels, and means for automatically taking up the slack in said chain drive as the slidable member is moved into its raised position.

5. A vehicle turning device comprising a guide mounted upon one axle of the vehicle, a member vertically movable in said guide, oppositely extending arms carried by the lower end of the vertically movable member and projecting laterally therefrom with relation to the longitudinal axis of the vehicle, wheels carried at the extremities of said arms in tandem relation to each other, a power-driven chain for rotating one of said wheels to swing the vehicle about the other end as a pivot and means for taking up the slack in said chain to compensate for the vertical movement of said vertically movable member.

In testimony whereof we have signed our names to this specification.

JESSE LANDON.
FREDERICK WILLIAM MARTYN.